United States Patent

[11] 3,631,293

[72] Inventor Bernard Laurent
 5, rue Jules Ferry, Clamart (Hauts-de-Seine), France
[21] Appl. No. 534,962
[22] Filed Mar. 4, 1966
[45] Patented Dec. 28, 1971
[32] Priority Mar. 5, 1965
[33] France
[31] 8016

[54] ELECTRONIC IMAGE TRANSFORMER APPARATUSES
 6 Claims, 2 Drawing Figs.
[52] U.S. Cl. .................................................... 315/11, 315/10
[51] Int. Cl. ...................................................... H01j 31/48
[50] Field of Search ........................................... 250/83.3 IR, 205, 199; 88/14 E; 313/87, 91; 178/6.8; 315/10, 11

[56] References Cited
UNITED STATES PATENTS
3,053,134  9/1962  Bjornson ..................... 250/199 X Primary Examiner—Rodney D. Bennett, Jr.
Assistant Examiner—Joseph G. Baxter
Attorney—Bailey, Stephens & Huettig ABSTRACT: An image-transforming apparatus operating by means of electron radiations includes a first modulator of the electron radiation, a projector for lighting the field of the apparatus, a second modulator with a frequency different from that of the first modulator for the light of the projector, and an electric filter which prevents the passage of the electron current at the frequency of the first modulator.

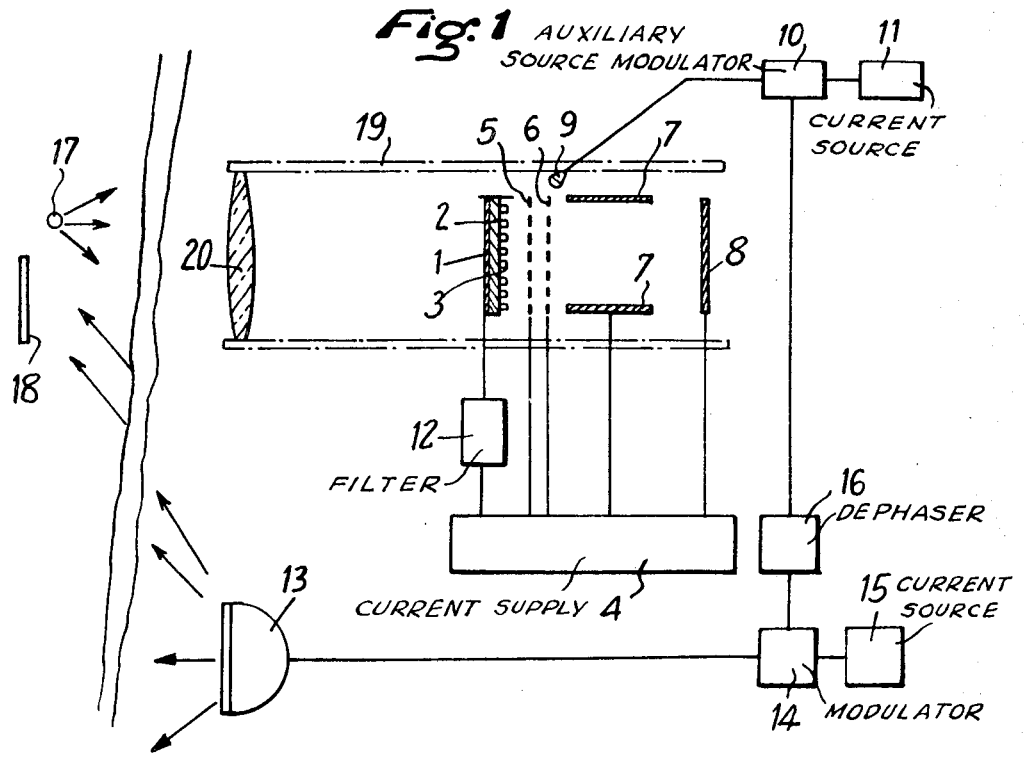
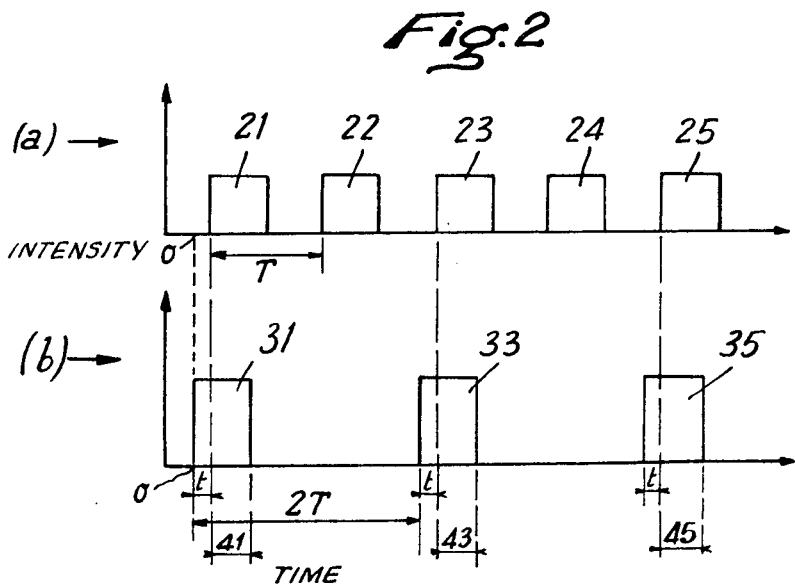

ELECTRONIC IMAGE TRANSFORMER APPARATUSES

This invention facilitates the observation of an object by means of improvements on known devices for transforming an optical image into another image produced through electrons emission.

The main objects of said invention are to produce a clearer final image of objects, especially lighted for this purpose; particularly in attenuating or suppressing effects of parasitic light in the field of observation of the device as well as the light eventually diffused by the atmosphere under the effect of the special lighting of the observation field.

The improvements according to the invention are essentially characterized by the combination of a first modulator of the radiation of electrons; a projector for lighting the field of view of the device; a second modulator, with a frequency different from the first one for the light of said projector; and an electric filter preventing the passage of the electron current at the frequency of the first modulator.

Another characteristic consists in that the frequency of the second modulator is a submultiple of that of the first modulator and that the impulses of the first modulator are delayed by a fixed period of time with respect to the corresponding impulses of the second modulator.

Moreover the said fixed period is adjustable.

The accompanying drawings relate to nonlimitative examples of said invention.

FIG. 1 is a diagrammatic view, partially in section of an observation apparatus according to this invention.

FIG. 2 shows the two emission curves of the two light sources described above.

Different tubes and other image transformers are known. They are sensitive to visible light and infrared rays, and consist, for example (FIG. 1), of a tube provided with an optical system represented by the lens 20; a conducting cathode 1, transparent to incident light; a light-sensitive layer 2 consisting of photoconducting and photovoltaic elements carrying an electron-emitting mosaic layer 3; an auxiliary light source 9, generally emitting ultraviolet light, lighting and activating the elements of the mosaic layer 3; extraction and acceleration grids 5 and 6; an electron focusing system 7; and a fluorescent screen 8 receiving electrons. Besides, the tube is provided with means 4 for feeding current to the above constituent parts of the tube.

The other elements of FIG. 1 pertain to the invention.

The optical system 20 yields an image on the photoconducting layer 2 from an object 18 located in its field.

This image induces potentials, which are a function of the luminous intensity of the image, on the mosaic elements 3. The mosaic elements, lighted by the rays of the ultraviolet source 9, emit electron fluxes through the photoemissive effect, as a function of their potentials, the latter being related to the intensity of the image obtained on the layer 2.

The grids 5 and 6 and the focusing device 7 accelerate and focus the electrons in order to form an electron image on the screen 8, which, being illuminated, yields an optically observable image which is a reproduction of the image obtained on the layer 2.

A first improvement according to the invention is to give a modulated emission to the auxiliary light source 9, either intermittent, or sinusoidal, or in any other way. For this purpose, known projectors are used, preferably one of those emitting high-frequency impulses with a very steep ascent gradient.

FIG. 1 gives the auxiliary source modulator 10, its current source 11; the modulator 14 of the main projector 13 and 15 its current source.

The removal of the rays originating from the parasitic source 17 is performed in the tube in the following manner, the incoming radiation of this source being assumed to be continuous. They are received on the sensitive layer 2 and produce various potentials on the mosaic elements 3, which, being activated by the auxiliary light 9, emit electron fluxes. The total resulting current is obviously modulated at the same frequency as the auxiliary source 9. A filter 12 (which is a conventional capacitor and inductance in parallel) is inserted in the electric circuit (closed loop) 4-1-8-4; at a frequency $f$, its resistance is very high, and therefore it allows only a small current to pass through. The parasitic source image intensity of the fluorescent screen 8 is a function of this small current; therefore it is very faint or even unobservable. Of course the image of an object 18 receiving a continuous light is not observable either. Another improvement of the image of the object 18, relates to the modulation of the luminous beam emitted by the projector 13 which lights the observation field of the tube 19, but with a frequency the value $f^1$ of which is different from $f, f/2$ for instance.

The electron fluxes emitted by the mosaic 3 will then be modulated by the pulse frequency resulting from the beating between the modulation frequency $f$ of the auxiliary source 9 and the modulation frequency $f^1$ of the main projector 13, that is, during the instants of simultaneous emission of the two light sources. The electric current in the closed loop 4-12-1-8-4 resulting from the electron emission will now be very little weakened by the filter 12. The image corresponding to the object 18 on the screen 8 will therefore become observable.

Finally, a third improvement has for its object the removal from the screen 8 of the luminous diffusion effect which can take place in the atmosphere located between the object 18 and the tube 19. The improvement consists in the introduction, through a known type dephaser 16, a device for producing a lag between phases of a uniform, time delay $t$, the value of which can be adjustable, between the beginning of an auxiliary light impulse and the beginning of the corresponding impulse from the main projector. In this case, the main projector emission frequency is a submultiple of that of the auxiliary source, in order to ensure the periodic repetition of the result. Should the time $t$ be shorter than the time necessary for the light emitted by the main projector, to go up to the object 18 to be observed and come back to the cathode 1, there is neither electron emission nor image formation on the screen 8 despite all the light radiations modulated by the projector 13 and reflected or diffused between the apparatus and the object 18, since the auxiliary light emission has not yet occurred.

FIG. 2 gives an example of the delay under consideration. The abscissae of the two curves represent times. The ordinates of $a$ are the luminous intensities of the auxiliary source 9. The ordinates of $b$ are the luminous intensities of the projector 13. The modulation period of the auxiliary source is T; 2T that of the main projector. The delay of the first auxiliary impulse 21 with respect to the first lighting impulse 31 is $t$; it is the same between 23 and 33 etc.

It can be seen that the image on the screen 8, can only be achieved during the coincidences 41, 43, 45 etc. which eliminates the main projector-emitted light and which is reflected towards the apparatus before the time $t$ has elapsed.

Nevertheless, this delay enables the elimination of the parasitic nonmodulated lighting, as above explained.

The invention may appear under different modifications, particularly on the tube of FIG. 1, For instance, instead of modulating the light of the auxiliary source 9, it is possible to modulate the electron fluxes, by modulating; either the potentials of the grids 3 and 5, or the potential of the focusing device 7.

From a general standpoint, in any image transformer device, producing electrons under the influence of the luminosity of an optical image, the results of the previously described invention are obtained, on the one hand, by the modulation of electron fluxes which yield the transformed image, on the other hand, by the modulation of the lighting of the observation field under the conditions already stated.

An example of an image transformer using semiconductors is the following:

The electrode 1 is similar to that of the tube shown in FIG. 1, the layer 2 is made of photoconducting or photovoltaic elements, the mosaic layer 3 is replaced by a layer of electroluminescent elements. A modulation electrode, for example of grid with fine meshes, in inserted between 2 and 3. Another transparent electrode similar to 1 is located on the outer face of the luminescent layer.

The electrode 1 receives the image obtained from the incident light; the potentials induced upon the photoconducting or the photovoltaic layer produce the luminescence of the layer 3 which is observed directly. The electron modulation is obtained from the modulation of the potential applied to said modulating electrode. A filter restraining the passing through of this modulation is located within the circuit of the two electrodes. The lighting of the zone to be observed is done with a projector modulated to a frequency different from that of the electrons.

I claim:

1. In a device to observe a field with at least one target and parasitic lights, an electron radiation sensitive screen and optical lens means for forming an image of said field on said screen, means associated with said optical lens means between the lens means and the screen to convert said image to electron radiations, a first modulator means for controlling said converting means, a projector for lighting the field, a second modulator means with a frequency different from that of the first modulator means for controlling the projector, and an electric filter means for preventing the passage of the electron current at the frequency of the first modulator means from the lens means to the screen, so that the image of the parasitic lights is prevented from reaching said screen.

2. Improvement according to claim 1, in which the frequency of the second modulator means is a submultiple of that of the first modulator means and the impulses of the first modulator means are delayed by a uniform predetermined time period with respect to the corresponding impulses of the second modulator means.

3. Improvement according to claim 1, in which the frequency of the second modulator means is a submultiple of that of the first modulator means and the impulses of the first modulator means are delayed by a uniform predetermined time period with respect to the corresponding impulses of the second modulator means, the said fixed time being adjustable.

4. In an image transformer tube comprising an optical system, a conducting cathode transparent to incident light joined to a photoconducting or photovoltaic layer upon which is formed the optical image of the objects in the observation field, a photoemissive mosaic upon said photoconducting or photovoltaic layer, an electron output and focalization system, a fluorescent screen upon which the electrons form the transformed image of the first optical image, an auxiliary light source activating the electron emission; by the photoemissive mosaic, an auxiliary light source modulated according to a first frequency; a lighting projector of the observation field of the said tube modulated according to a second frequency different from the previous one, and a filter restraining the modulated electron emission at the first frequency.

5. Improvement according to claim 4, in which the frequency of the second modulator is a submultiple of that of the first modulator and the impulses of the first modulator are delayed by a uniform predetermined time period with respect to the corresponding impulses of the second modulator.

6. Improvement according to claim 4, in which the frequency of the second modulator is a submultiple of that of the first modulator and the impulses of the first modulator are delayed by a uniform predetermined time period with respect to the corresponding impulses of the second modulator, the said time period being adjustable.

* * * * *